No. 767,334. PATENTED AUG. 9, 1904.
E. EIMER.
OPTICAL TESTING INSTRUMENT.
APPLICATION FILED DEC. 17, 1903.
NO MODEL.
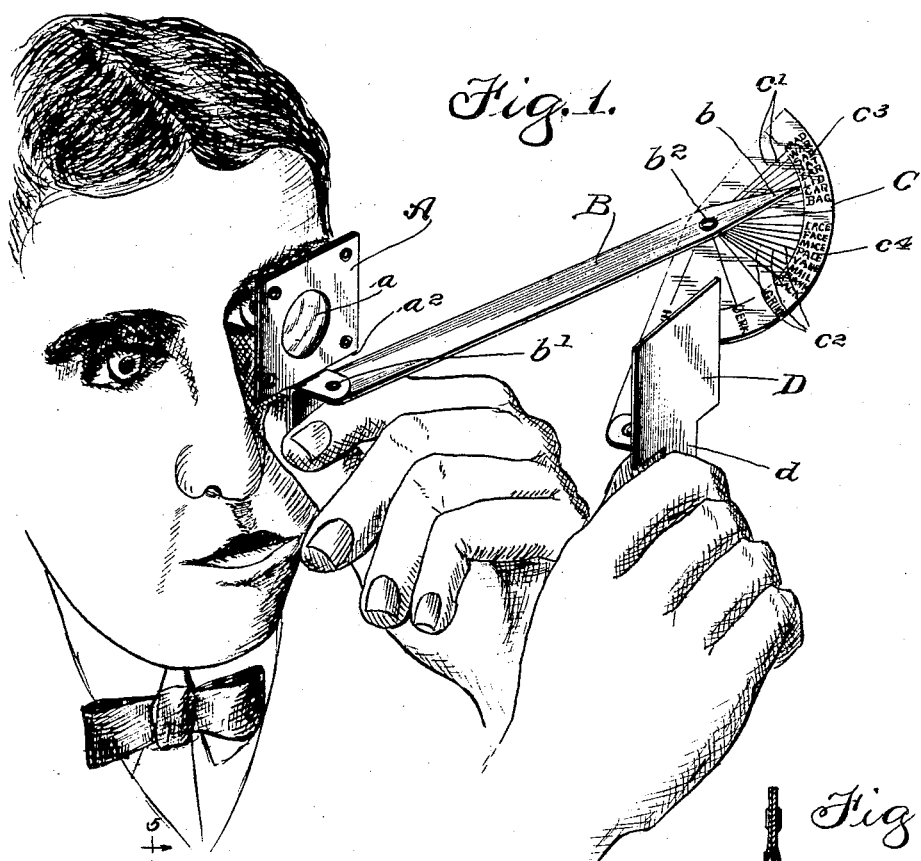
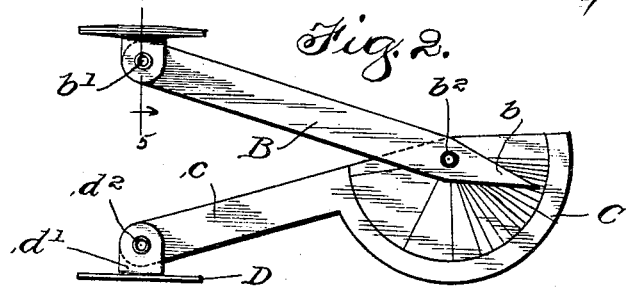
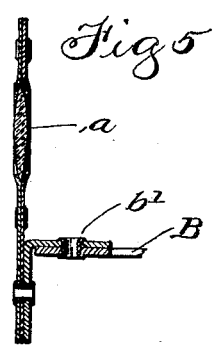
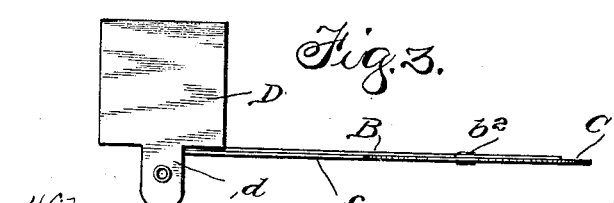
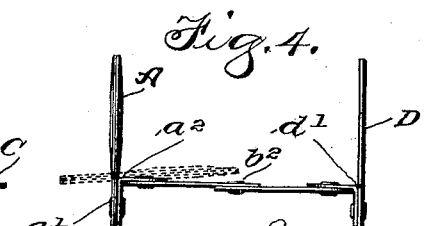
Witnesses
J. B. Weir.
Robert H. Weir.
Inventor
Ernest Eimer,
By Buckley & Durand
Attys.

No. 767,334.　　　　　　　　　　　　　　　　　　　　　　Patented August 9, 1904.

UNITED STATES PATENT OFFICE.

ERNEST EIMER, OF MUSKEGON, MICHIGAN.

OPTICAL TESTING INSTRUMENT.

SPECIFICATION forming part of Letters Patent No. 767,334, dated August 9, 1904.

Application filed December 17, 1903. Serial No. 185,469. (No model.)

*To all whom it may concern:*

Be it known that I, ERNEST EIMER, a citizen of the United States of America, and a resident of Muskegon, Muskegon county, Michigan, have invented a certain new and useful Improvement in Optical Testing Instruments, of which the following is a specification.

My invention contemplates an improved, simple, and exceedingly-inexpensive form of optical instrument for testing the vision. It is especially adapted for measuring the extent of the limits of distinct vision in different individuals and for thus determining the focal length of the lens necessary to correct imperfect sight.

In the preferred embodiment of my invention one advantage and valuable feature consists in pivotally or hingedly connecting the different parts in such manner that they can be readily folded up, so as to adapt the device in its entirety for transmission through the mail. Thus in this way my improved testing instrument can be readily and conveniently sent through the mail to persons desiring to order spectacles or glasses.

Another prominent feature of my invention consists in constructing all the positively-connected parts, except the lens, of cardboard, thereby rendering the device exceedingly cheap and inexpensive in character and of such nature that none of the different cardboard parts can become disconnected or misplaced.

Another feature consists in providing the testing instrument with a dial and a rotary pointer, the dial being graduated and provided with different words or characters, which, through the medium of a private key, enable the optician to determine the character of lens necessary for the person ordering the glasses.

The nature and advantages of my invention will, however, hereinafter more fully appear.

In the accompanying drawings, Figure 1 is a perspective illustrating the method of using my improved testing instrument for testing the vision or sight of people desiring to order glasses or spectacles. Fig. 2 is a plan of my improved testing instrument. Fig. 3 is a rear end view of the said instrument. Fig. 4 is a side elevation of the said instrument, showing the folded position of the lens-holder in dotted lines. Fig. 5 is an enlarged vertical section on line 5 5 in Fig. 2.

As thus illustrated, my improved optical testing instrument for determining the character of defect in vision consists of a lens-holder A, provided, preferably, with a double-convex lens $a$, a handle $a'$, and a flexible hinge connection $a^2$, the latter being provided for flexibly connecting the lens-holder with the arm or pointer B. This arm B, which has a pointed end $b$, adapted to serve as a pointer, has its other end pivotally connected with the said hinge at $b'$ and is pivotally connected at the intermediate point $b^2$ with the dial C. The target D, which corresponds in shape to the lens-holder A, is provided with a handle portion $d$ and with a flexible hinge connection $d'$, the latter flexibly connecting the target with the arm $c$ of the said dial. This hinge connection $d'$ is pivotally connected with the arm $c$ at $d^2$. The said lens-holder preferably consists of two apertured pieces of cardboard, secured together with the lens between them. The said dial is provided with a series of graduations $c'$, corresponding to the different degrees of myopia, and with another series of graduations, $c^2$, corresponding to the different degrees of presbyopia. Preferably the three-letter words $c^3$ are arranged opposite the graduations $c'$, while the four-letter words $c^4$ are arranged opposite the graduations $c^2$. Thus the word "Mad" indicates the greatest degree of myopia, while the least amount of myopia is indicated by the word "Bag." In a similar manner the smallest degree of presbyopia is indicated by the word "Lace," while the greatest degree of this sort of defect in the vision is indicated by the word "Hart."

The target D can be provided on its face—that is to say, on its surface facing the lens—with lettering in small type.

The manner of using the device thus constructed is obvious. The person desiring to order spectacles or glasses simply holds the lens and the target in vertical positions, as shown in Fig. 1, and then moves the target back and forth until the printing is clearly distinguishable and readable through the lens. The person thus using the instrument can then simply observe the location of the pointer on the dial—that is to say, can take note of the word toward which the pointer $d$ is pointing. The optician when advised of this particular word then understands immediately through the medium of a private key the character of the defect in the vision.

Thus it will be seen that I provide an optical testing instrument which can be readily folded up and placed in an envelop or package and transmitted without danger of breakage through the mails, thus facilitating the ordering of spectacles or glasses.

Inasmuch as all of the parts of the instrument are positively connected together, the connections being either flexible or pivotal or hinge-like in character, it is obvious that the parts can be readily flattened into a suitable condition for transmission through the mail and that no portion of the instrument can become detached and lost.

What I claim as my invention is—

1. An instrument for testing vision, consisting of a lens-holder and a target connected for relative swinging adjustment toward and away from each other, and a graduated indicating device, all adapted to be folded into a flat or practically flat condition.

2. An instrument for testing vision, comprising a lens-holder and a target connected for relative adjustment, and a graduated dial provided with a pointer adapted to be rotated about its axis by the relative adjustment of the lens-holder and target, all adapted to be folded into a flat or practically flat condition.

3. An instrument for testing vision, comprising a plurality of pieces of cardboard pivotally and flexibly connected, and including a lens-holder and a target connected for relative swinging adjustment toward and away from each other, and a graduated indicating device, all adapted to be folded into a flat or practically flat condition.

4. An instrument for testing vision, comprising a lens-holder and a target connected for relative swinging adjustment toward and away from each other, and a graduated indicating device adapted to be operated by relative adjustment of the lens-holder and target, said indicating device being provided with a series of arbitrary key-words representing different degrees of defect in vision.

5. An instrument for testing vision, comprising a lens-holder and a target, a dial pivotally and flexibly connected with the target, and a pointer pivotally connected with the dial and flexibly and pivotally connected with the lens-holder, all adapted to be folded into a flat or practically flat condition.

6. An instrument for testing vision, comprising a lens-holder, a target, and suitable indicating means, all of said parts being positively connected together by pivotal or hinge-like connecting means, whereby no part can become detached from the others.

7. An instrument for testing vision, comprising a lens-holder and a target connected for relative adjustment, a dial provided with a pointer and pivotal connection between the dial and pointer, said dial and pointer being adapted to be adjusted relatively by the movements of the lens-holder and target toward and away from each other.

8. An instrument for testing vision, comprising a lens-holder and a target, and suitable indicating means, said lens-holder having both a flexible and a pivotal connection with the indicating means.

9. An instrument for testing vision, comprising a lens-holder and a target, and suitable indicating means, said target having both a flexible and a pivotal connection with the indicating means.

Signed by me at Muskegon, Michigan, this 17th day of November, 1903.

ERNEST EIMER.

Witnesses:
MILO G. PRAY,
HARRY A. RIETDYK.